United States Patent [19]

Heiman et al.

[11] Patent Number: 4,509,682
[45] Date of Patent: Apr. 9, 1985

[54] METHOD AND APPARATUS FOR FUMIGATING GRAIN AND OTHER COMMODITIES IN BULK STORAGE COMPARTMENTS

[75] Inventors: Gerald R. Heiman, Pasadena; Frank Fleck, Arcadia, both of Calif.

[73] Assignee: Pestcon Systems, Inc., Alhambra, Calif.

[21] Appl. No.: 433,952

[22] Filed: Oct. 13, 1982

[51] Int. Cl.³ .......................... A61L 9/04; B05B 1/28
[52] U.S. Cl. .................................. 239/60; 239/120; 99/467
[58] Field of Search ............... 239/60.6, 57, 120, 58, 239/121, 34; 422/418, 419; 426/305, 306; 99/467; 47/58

[56] References Cited

U.S. PATENT DOCUMENTS 1,662,738  3/1928  Coogle ................... 239/57

FOREIGN PATENT DOCUMENTS 366843  9/1938  Italy ...................... 239/60

Primary Examiner—Andres Kashnikow
Assistant Examiner—Kevin Patrick Weldon
Attorney, Agent, or Firm—Fulwider, Patton, Rieber, Lee & Utecht

[57] ABSTRACT

A method of fumigating grain in the hold of a ship with receptacles that are placed on the bottom of the hold before loading of the grain, and supplied with gas-producing solid fumigant through feed tubes after the grain has been loaded into the hold. The receptacles comprise inner and outer coaxial conical screens supported over a bottom tray for collecting powder residue, the outer conical screen having an inlet fitting in its upper end for connection to a feed tube, and being reinforced by a framework for sustaining the weight of the grain.

12 Claims, 9 Drawing Figures

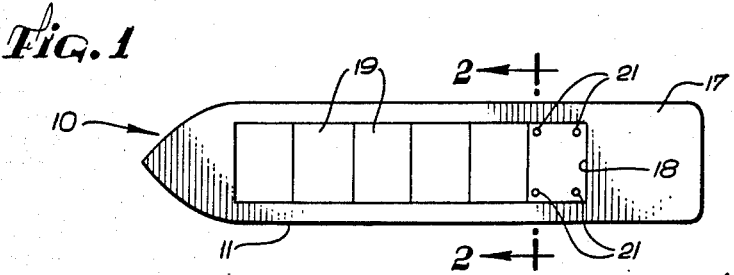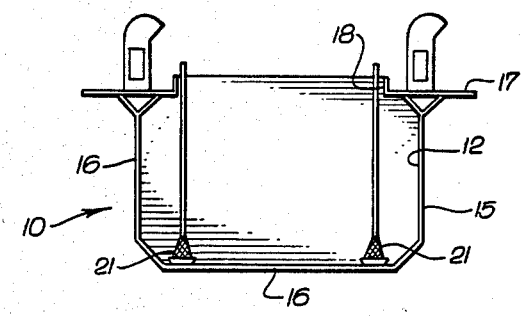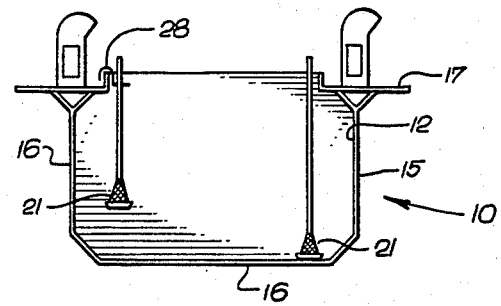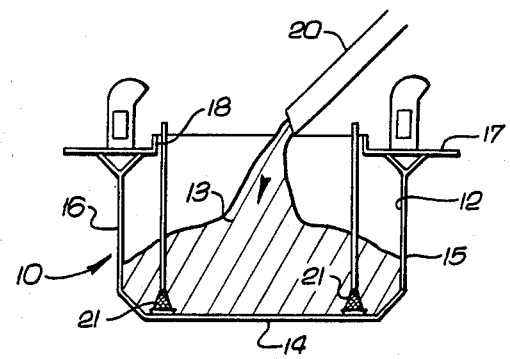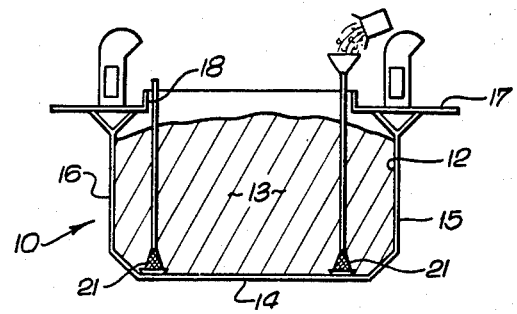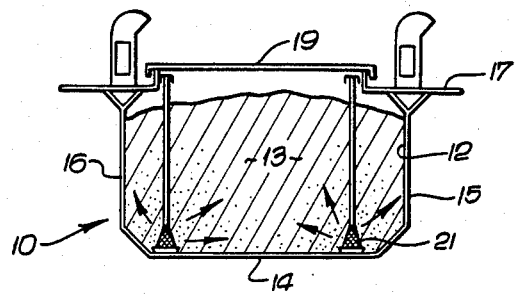

METHOD AND APPARATUS FOR FUMIGATING GRAIN AND OTHER COMMODITIES IN BULK STORAGE COMPARTMENTS

BACKGROUND OF THE INVENTION

This invention relates to the fumigation of grain and other commodities in bulk-storage compartments, and has particular reference to the fumigation of grain in the holds of seagoing vessels or other large containers with fumigants that produce toxic gases for permeating the body of grain and killing pests, primarily insects but sometime rodents as well.

In the shipment of grain and other commodities, it is a common practice to fumigate each storage compartment, or hold, of a ship by placing a quantity of gas-producing fumigant in the hold with the grain and sealing the hold so that toxic gas produced by the fumigant is confined in the hold for contact with the pests during shipment. The object is to produce lethal concentrations of the toxic gas throughout the body of grain in the compartment, and to maintain that concentration for the period of time necessary to kill all insects in the grain.

A popular type of fumigant that has been in use for many years is metallic phosphide, such as aluminum phosphide which decomposes in the presence of water to form hydrogen phosphide, or phosphine, a toxic gas that has been very successfully used as a fumigant. Reference is made to U.S. Pat. Nos. 2,826,486, 2,826,527 and 3,132,067 for details regarding fumigants of this general type, in which the fumigant in solid form, usually tablets or pellets, is activated by atmospheric moisture to produce the toxic gas, leaving only a residue of decomposed and usually harmless powder.

Phosphine is poisonous not only to insects and rodents but also to humans, so great care is exercised in its handling, and workers (longshoremen) usually will not enter a compartment after fumigation is commenced. For this reason, the usual practice has been to place the fumigant in the grain after a hold has been filled, or substantially filled, by inserting it under the surface of the grain with probes, or by laying it on top of the grain, sometimes in compartmented "blankets" or bags of moisture- and gas-pervious material. These bags or blankets facilitate handling of the gas producing solid fumigant, permit atmospheric moisture to activate the fumigant and permit the toxic gas to escape from the container and work its way into and through the grain. They also contain the powder residue, and can be separated from the grain at the destination, thereby satisfying those who are concerned about the presence of such residues in the grain.

Normal air movement in a body of grain in a hold is upward, so penetration of fumigating gas all the way to the bottom from fumigant that is placed at or near the top of the grain is questionable, particularly if the hold is on the order of sixty feet deep, as many are. Moreover, the sealing of the hatches of the holds is not always perfect, and gas generated at the top sometimes escapes from the top without effecting full penetration. Thus, fumigating from the top is not completely satisfactory.

Although it would be desirable to place the fumigant in the bottom of a hold before the grain is loaded, regulations prevent this because of the danger to the human beings who work in the hold as it is loaded. Efforts have been made to provide for the introduction of fumigating gas beneath the surface of grain, for example, as in the apertured pipe shown in U.S. Pat. No. 4,059,048, but have not been completely successful, probably because a "chimney" effect results in the release of most of the gas at or near the upper end.

The principal objections to the prior methods of placing fumigants in large storage compartments thus may be summarized as follows: the possibility of incomplete distribution of fumigating gas through the grain, and particularly downward from fumigant applied at or near the top; the time required in "probing" the fumigant into the upper portion of the grain; the objections of longshoremen to working in a hold after the fumigant is placed in the grain; the danger of loss is fumigating gas through imperfect seals before it has penetrated the grain; and the objections of some people to the mixing of powder residues with the grain. The primary object of this invention is to provide a method and apparatus for avoiding these objections, making it possible to fumigate large bodies of grain and other commodities more easily and effectively, and perhaps more safely, than has been possible with prior methods and apparatus.

SUMMARY OF THE INVENTION

The present invention resides in a novel method and apparatus for placing fumigant at selected locations and levels throughout a body of grain or the like in a bulk-storage compartment after the latter has been loaded, while at the same time providing effective exposure of the fumigant to atmospheric moisture in the body of grain, permitting placement of the fumigant entirely or in part at the bottom of the storage compartment and insuring that it flows through the grain, and maintaining the solid fumigant and the powder residue separate from the grain to alleviate concerns about contamination.

For the foregoing purposes, the method of the invention generally comprises the steps of (1) providing a selected number of receptacles for holding solid fumigant, each having a gas- and moisture-pervious chamber for holding solid fumigant and having a bottom that is impervious to the powder residue to collect it and maintain it separate from the grain;

(2) positioning the receptacles, with their chambers unfilled, in selected locations within the compartment before the grain is introduced;

(3) providing feed passages extending from the top of the compartment to the chambers;

(4) loading the grain into the compartment; and (5) supplying solid fumigant to the chambers through the feed passages to be activated in the chambers by atmospheric moisture, thereby to release toxic gas from the chambers into the grain or the like, and to retain the powder residue in the receptacles.

In most instances, the receptacles will be placed at the bottom of a compartment in a selected pattern, for rising of the toxic gas substantially uniformly through the body of grain or the like. In some instances, however, the depths of the receptacles may be staggered, if it is desired to introduce gas to the upper levels more rapidly. The upper ends of the feed passages may be left open to treat the atmosphere above the grain, but preferably are capped to avoid a chimney effect and force release of the gas from the receptacles.

The preferred receptacles of the invention have lower collector trays that are impervious to the powder residue, and define the fumigant-holding chambers between two spaced chamber walls which pass atmospheric moisture from the compartment freely into the chamber and into effective contact with the solid fumigant, and also pass the toxic gas freely out of the chamber into the body of grain or the like. For this purpose, each chamber herein is defined by an inner conical wall of screen material forming an inside wall for supporting the fumigant, and a larger outer conical wall of screen material forming a top or outside wall for the chamber. These conical inner and outer surfaces are coaxial and effective to spread the solid fumigant in a relatively thin conical layer for a high degree of exposure to activating moisture, and to release the gas that is generated.

To enable the receptacles to sustain the pressure produced by the weight of the grain, a reinforcing framework is provided for the outer conical wall, preferably in the form of a plurality of longitudinal rods converging from the base of the conical wall toward its upper end, where they are secured to a suitable inlet fitting for a feed passage. The upright rods are secured to a series of vertically spaced, concentric rings of progressively diminishing diameter toward the upper end, preferably by welding. The conical walls converge downwardly and preferably are supported on a screen covering the top of a tray, which forms the bottom of the receptacle.

The feed passages are formed by elongated feed tubes that extend from the top of the compartment down to the receptacles, opening into the chambers through fittings in the upper ends of the outer conical screen. Usually, the tubes will be long enough to extend to or through the hatches, for easy filling from outside the hold. Then they may be cut off or otherwise shortened, and capped. To suspend receptacles at selected depths in the chambers, these tubes may be connected to the receptacles and hung from the upper walls.

Other objects and advantages will become apparent from the following detailed description, taken in conjunction with the accompanying drawings.

DESCRIPTION OF THE DRAWINGS

FIG. 1 is a schematic plan view of a representative ship hull having a series of holds adapted to be fumigated in accordance with the present invention;

FIG. 2 is an enlarged fragmentary cross-sectional view taken along line 2—2 of FIG. 1 showing the positioning of the receptacles in a hold;

FIG. 3 is a view similar to FIG. 2 showing the loading of the grain into the hold;

FIG. 4 is a view similar to FIG. 3 with the hold loaded and showing the supplying of solid fumigant to the receptacles;

FIG. 5 is a view similar to FIG. 4 showing the hold closed for fumigation;

FIG. 6 is a view similar to FIG. 2 showing an alternative method of positioning the receptacles;

DETAILED DESCRIPTION

Figure 8:
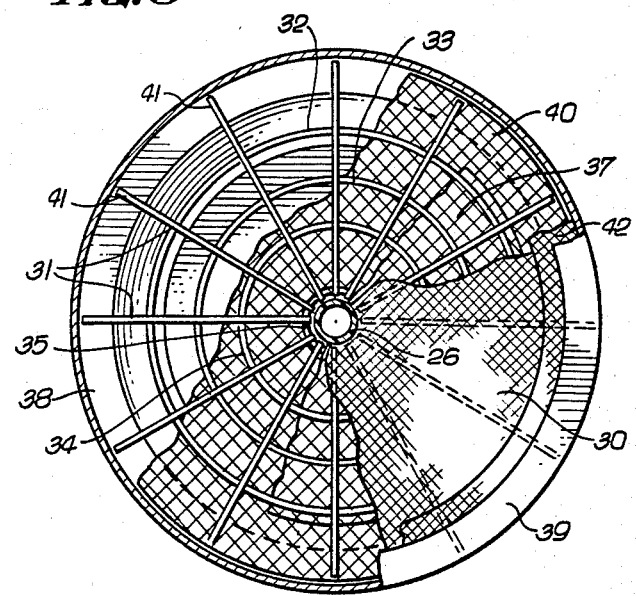
FIG. 8 is a view taken along the line 8—8 of FIG. 7, with portions broken away for clarity of illustration.

Shown schematically in FIGS. 1 through 6 for purposes of illustration is a ship 10 having a hull 11 (FIG. 1) that is divided longitudinally into a series of storage compartments or holds 12 for storing and transporting grain 13 or other commodities, and in which the grain or other commodity is fumigated during shipment. Fumigation of grain in ship holds in accordance with the present invention is illustrative of the use of the invention in fumigating various commodoties in large bulk-storge compartments of various kinds.

As shown in FIGS. 2-6, a representative hold 12 is formed by a bottom wall 14, upright sidewalls 15 and 16 shown as connected to the bottom wall by inclined walls, and a top wall or deck 17 to which the sidewalls are connected and sealed. An access opening or hatch 18 is defined in the top wall by low upright walls, and a hatch cover 19 is provided for sealing the hatch when the hold 12 has been filled.

Such holds are loaded with grain through the open hatches, usually with loading spout 20, as illustrated in FIG. 3, for directing the grain 13 into and around the hold in the desired manner. The holds vary widely in size, depending upon the size of the vessel. For example, a typical hold may be as much as 50 to 60 feet deep, and as much as 60 to 70 feet in width and length, to hold many thousands of bushels of grain.

As previously stated, several different methods of fumigating grain in compartments of this size have been used without satisfying all of the objectives of optimum fumigation. Fumigant cannot be placed at the bottom because fumigating gas will be released during filling, with resulting danger to those working in the hold and also with some loss of the fumigating gas. When the fumigant is placed at or near the top of the body of grain, it may not penetrate all the way to the bottom, both because of the normal upward air movement within the grain and because the hatches 18 sometimes are not perfectly sealed and permit the gas to escape.

In accordance with the method of the present invention, a suitable number of receptacles 21 having gas and moisture pervious chambers 22 (FIG. 7) for holding solid fumigant 23 and bottoms 24 for collecting and holding the powder residue are placed in unfilled condition in selected locations within the compartment that are considered to be optimum for fumigation purposes, feed passages 25 are provided from the top of the compartment, in tubes 26 connected to inlets 27 of the receptacles, and the compartment is filled with grain around the receptacles and tubes while the receptacles are empty. Then solid fumigant 23 is supplied to the receptacles through the feed tubes 26, the tubes are closed, and the hatches 18 are closed and sealed as fumigation commences. The moisture that is present in the grain penetrates the receptacles and activates the solid fumigant therein, and the fumigating gas that is generated flows out of the receptacles to permeate the grain from the bottom toward the top.

Shown in FIGS. 2 through 5 is a preferred arrangement of receptacles 21, in which one is positioned generally beneath each of the four corners of the hatch 18, on the bottom wall 14 of the hold 12. The feed tubes 26 initially extend up through the hatch and are suitably secured against displacement while the hold is filled, an excess of length preferably being provided to allow for some bending within the grain. One suitable type of feed tube is relatively large plastic pipe, such as a 1¼ inch diameter P.V.C. pipe.

Shown in FIG. 6 is an alternative arrangement that may be used where more rapid introduction of fumigating gas to the upper portion of the hold is desired. Here, the four receptacles 21 again are positioned generally beneath the four corners of the hatch 18, but only two are on the bottom wall 14. The other two are suspended approximately one-half way between the top and the bottom, hanging by their feed tubes from connectors 28 at the hatch.

The amount of solid fumigant 23 to be used depends upon the particular fumigating material and the size of the hold to be fumigated. For example, using FUMI-TOXIN brand of aluminum phosphide tablets, sold by Pestcon Systems, Inc., Alhambra, Calif., thirty-three to forty-five tablets (3-gram size) should be used for each one-thousand cubic feet of hold space. It 0.6 gram FUMITOXIN pellets are used instead of tablets, five times the number of pellets should be used. Such tablets are conveniently packaged in flasks of five hundred each, and an appropriate number of flasks may be emptied quickly and easily into each of the receptacles in the hold, through the feed tubes. The receptacles may be made in a standard size that is large enough to hold the largest amount of fumigant that could be needed for any compartment, and then only partially filled for smaller compartments.

The rate of release of fumigating gas depends upon the degree of exposure of the solid fumigant to moisture. Usually, lethal concentrations are obtained within about three days. When the solid fumigant has been exhuasted, the residue remains in the bottoms of the receptacles, for easy separation from the grain as it is unloaded at the end of the voyage. There is no residual effect from phosphine gas used in fumigation.

Figure 7:
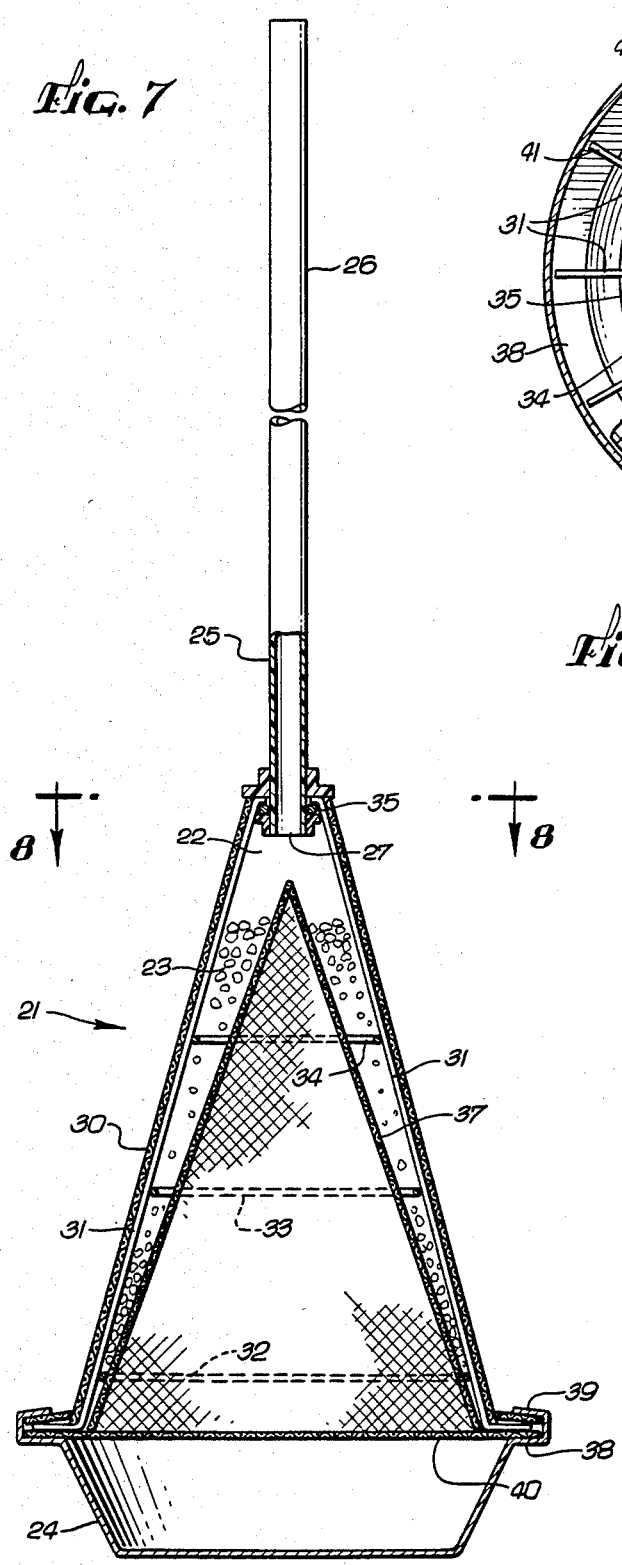
FIG. 7 is an enlarged cross-sectional view taken in a vertical central plane through a receptacle embodying the novel features of the present invention, connected to a supply tube that is shown partly in side elevation.
Figure 9:
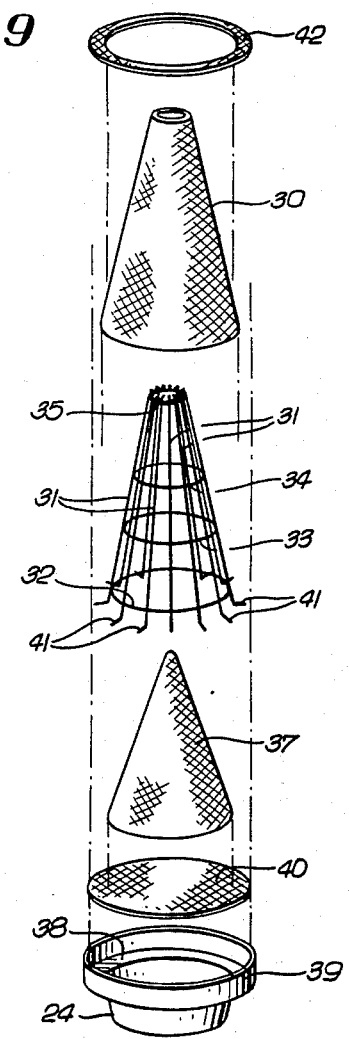
FIG. 9 is an exploded perspective view, on a reduced scale, showing parts of the receptacle.

As can be seen in FIGS. 7 through 9, the fumigating receptacle 21 of the present invention comprises an imperforate bottom member 24 for collecting and holding powder residue, herein a circular tray, and a conical outside wall 30 composed of screen material having a mesh size small enough to hold the solid fumigant particles in the receptacle. For example, so-called hardware cloth having ⅛-inch by ⅛-inch openings is a satisfactory screen material for the outside wall. If a very small size of grain is to be handled, the receptacle may be enclosed in a cloth sack (not shown) with its open end clipped around the feed tube 26, but this should not be necessary.

Because of the great weight of the grain above the receptacle, a reinforcing frame is provided for the outside wall. Herein, this frame comprises a plurality of stiff rods 31, preferably composed of metal, that are inclined upwardly and radially inwardly along the inner side of the outside cone. The rods are secured, for example by welding, to a series of vertically spaced concentric rings 32, 33, 34 and 35 of progressively reduced diameter, the lower ring 32 being just above the base of the cone and the upper ring 35 forming the top of the cone, which is slightly truncated. The screen material is secured to the upper ring, which thus forms an inlet opening for admitting solid fumigant into the receptacle, and a fitting is mounted in this ring to receive the lower end of a feed tube 26.

To maintain the solid fumigant in a relatively thin layer within the receptacle, for effective contact of atmospheric moisture with all of the solid fumigant in the receptacle, an inside wall 37 is provided in the receptacle in spaced relation with the outside wall, and cooperating therewith to define a chamber for holding the material in a relatively thin, generally conical layer with a hollow center, for a relatively high degree of surface area and effective exposure of the whole mass to atmospheric moisture. This insures rapid action and reduces the chance that any of the solid fumigant will not be activated by exposure to moisture.

The inside wall 37 is an axially shorter conical screen disposed within the outside screen 30 and having a base diameter that is only slightly smaller than the base diameter of the outside screen. With this arrangement, the chamber 22 in the receptacle is of downwardly tapering thickness due to the convergence of the two cones, and the fumigant layer 23 is thinnest at the bottom, increasing in thickness as it progresses upwardly within the receptacle. The screen material of the inside wall allows the powder residue of the solid fumigant to fall through and into the tray 24. A suitable material for this purpose is hardware cloth having ¼-inch by ¼-inch openings.

While the conical walls 30 and 37 may be supported in various ways on the bottom tray 24, the illustrative receptacle has a simple and effective construction that permits effective assembly in the field from a relatively compact, knocked-down construction. The bottom tray has an outwardly turned flange 38 around its rim, with an upstanding annular flange 39 around the flange 38, and a circular bottom screen 40 of relatively large mesh is placed on the flange 38 to act as a support, and as a protective screen for the tray. The rods 31 of the reinforcing framework have outwardly bent, horizontal feet 41 on their lower ends, which rest on the screen 40 and the flange 38. The outer conical wall 30 rests on these feet, while the inner conical wall 37 rests on the circular screen 40.

Preferably, a ring 42 screen of relatively small mesh screen is provided to surround the base of the outer conical wall 30 and overlie the flange 38, to insure against loss of grain into the tray. This screen ring is clamped against the flange 38 by bending the flange 39 down over it, thus securing all of the parts together. With this arrangement, assembly can be done conveniently and rapidly just before the receptacles are used.

Although the receptacle 21 may be made in various sizes and particular dimensions are not critical, one suitable unit for use in large bulk-storage containers such as the holds of ships comprises a tray 24 about five inches deep and having a flange 38 about eighteen inches in diameter; an outside cone 30 about twenty-seven inches in height and with a base diameter of about fifteen inches; and an inside cone having a height of about twenty-two inches and a base diameter of about fourteen inches, to fit closely inside the base of the outside cone. Preferably, the fitting 36 is a 1¼ inch P.V.C. fitting mounted in the top ring 35 for connection to the feed tube 26.

It will be apparent from the foregoing that the present invention provides an effective method and apparatus or device for fumigating grain and other commodities in large bulk-storage compartments, and particularly in the holds of ships. It also will be apparent that, while one preferred method and one preferred receptacle have been illustrated and described with particularity, various modifications and changes may be made within the spirit and scope of the invention.

We claim as our invention:

1. A fumigating receptacle for use with solid fumigant that releases fumigating gas upon exposure to atmosphere and produces a powder residue, comprising:
   an outside wall composed of material that is pervious to atmosphere and the fumigating gas, and having an inlet opening generally at its upper end for admitting solid fumigant into the receptacle;
   an inside wall spaced below the outside wall and cooperating therewith to define a chamber for holding the solid fumigant in a thin layer, said inside wall being pervious to the residue to pass the latter out of the chamber;
   and a bottom tray on said receptacle below said inside wall in a generally upwardly open position for collecting fumigant residue passed from the chamber and maintaining it in the receptacle.

2. A fumigating receptacle for use with solid fumigant that releases fumigating gas upon exposure to atmosphere leaving a generally powdered residue, having in combination:
   an outside conical wall that is pervious to the atmosphere and the fumigating gas and capable of holding the solid fumigant in the receptacle;
   an inside conical wall that is pervious to the atmosphere and the fumigating gas, said inside wall being spaced below and coaxial with the outside conical wall and cooperating therewith to define a chamber for holding solid fumigant in a relatively thin and generally conical layer, said inside wall being capable of holding the solid fumigant in the chamber for exposure to the atmosphere;
   an inlet generally at the upper end of said outside wall for admitting the solid fumigant into the chamber to be spread around the inside conical wall; and
   a tray supported at the lower ends of said outside and inside walls for collecting and holding the residue from the solid fumigant.

3. A fumigating receptacle as defined in claim 2 wherein said outside conical wall is composed of screen material and has a reinforcing frame for supporting the screen within material to be fumigated.

4. A fumigating receptacle as defined in claim 2 wherein said inside conical wall is composed of screen material.

5. A fumigating receptacle as defined in claim 2 wherein said tray includes a support holding said conical walls above said tray.

6. A fumigating receptacle as defined in claim 5 wherein said tray has a rim with an outwardly extending flange, and further including a screen resting on said flange and covering said tray, said screen forming said support.

7. A fumigating receptacle as defined in claim 6 further including an uptruned second flange extending around the first-mentioned flange on said rim and being bendable into a position securing said conical walls and said screen to said tray.

8. A fumigating container for use with a solid fumigant that releases fumigating gas and produces a generally powdered residue, said container having, in combination:
   an outside wall that is pervious to atmosphere and fumigating gas, and having a first preselected shape defining an inside space, an inlet opening generally at an upper end of said outside wall, and means for reinforcing said outside wall for withstanding the weight of the material to be fumigated;
   an inside wall that is pervious to atmosphere and fumigating gas, and having a second preselected shape that is substantially similar to said first shape and is disposed beneath and inside the latter to cooperate therewith in defining a chamber in the receptacle in the form of a thin layer having substantially the same shape as said walls, thereby to support the solid fumigant in said chamber in a thin layer with relatively high surface area;
   a tray; and
   means for mounting said tray below said outside and inside walls at the lower ends of said walls for collecting and holding residue from the solid fumigant.

9. A fumigant receptacle for use with a solid fumigant that releases a fumigating gas upon exposure to atmosphere leaving a powder residue, said receptacle comprising;
   an outside wall of a screen material pervious to atmosphere and generally impervious to passage of the solid fumigant, said outside wall having a generally conical shape with a slightly truncated upper apex end defining an inlet opening;
   an inside wall of a screen material pervious to atmosphere and generally impervious to passage of the solid fumigant, said inside wall having a generally conical shape and being spaced below and generally coaxial with said outside wall and cooperating therewith to define a chamber for supporting the solid fumigant in a relatively thin, generally conical layer, said inside wall having an upper apex end disposed generally coaxially in spaced relation below said inlet opening whereby solid fumigant entering said chamber through said inlet opening is dispersed by said inside wall generally throughout said chamber;
   frame means within said outside wall for maintaining said outside wall in a generally conical shape withstanding the weight of material to be fumigated;
   a tray for collecting and holding powder residue from the solid fumigant; and
   means for mounting said tray in an upwardly open position generally at the lower end of said outside wall.

10. The fumigant receptacle of claim 9 wherein said tray includes an outwardly projecting peripheral flange, and further including a screen resting on said flange and covering said tray, said inside wall resting upon said screen and said frame including lower feet resting upon said screen, a retainer ring resting upon said frame feet and engaging the lower end of said outside wall, and upturned rim means on said tray flange, said rim means being bendable to a position securing said retainer ring and said frame feet with respect to said flange.

11. The fumigant receptacle of claim 9 wherein said inside wall is slightly smaller than said outside wall.

12. The fumigant receptacle of claim 9 further including a feed tube, and fitting means at said inlet opening for receiving one end of said feed tube, said feed tube defining an open column for passage of the solid fumigant downwardly into said chamber.

* * * * *